(No Model.)

B. B. KEYES.
TOOL HOLDER FOR LATHES.

No. 332,086. Patented Dec. 8, 1885.

Witnesses:
Frank G. Parker
William Dodson

Inventor
Benjamin B. Keyes

UNITED STATES PATENT OFFICE.

BENJAMIN B. KEYES, OF CHELSEA, MASSACHUSETTS.

TOOL-HOLDER FOR LATHES.

SPECIFICATION forming part of Letters Patent No. 332,086, dated December 8, 1885.

Application filed January 28, 1885. Serial No. 154,248. (No model.)

*To all whom it may concern:*

Be it known that I, BENJAMIN B. KEYES, of Chelsea, in the county of Suffolk and State of Massachusetts, have invented a new and useful Improvement in Tool-Holders for Lathes, of which the following, taken in connection with the accompanying drawings, is a specification.

My invention relates to a device to be attached to the spindle of the tail-stock of a lathe, and has for its object to hold different tools for operating as drills, trimming-tools, &c. This object I attain by the mechanism shown in the accompanying drawings, in which—

Figure 1:
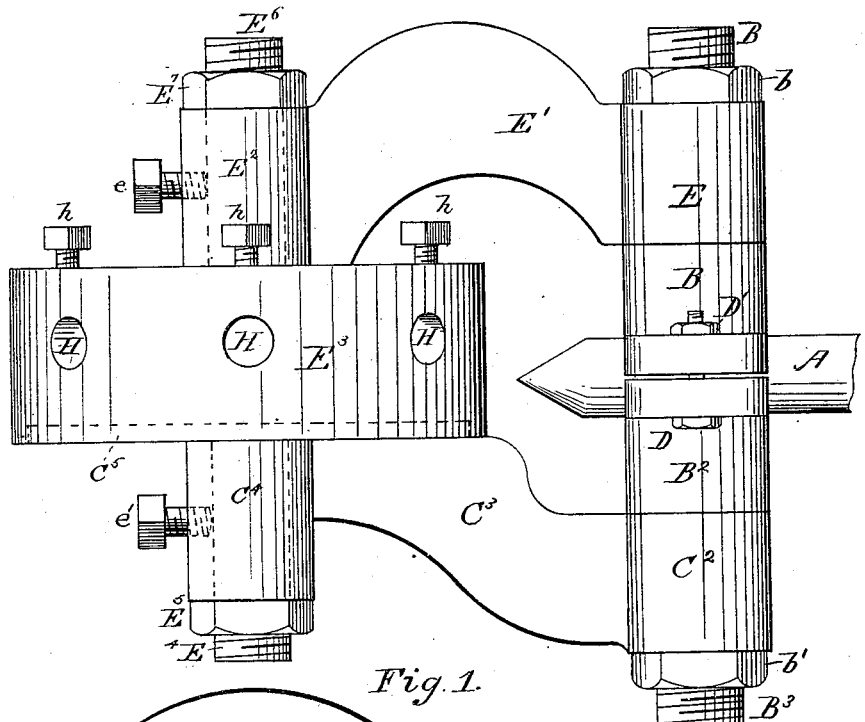
Figures 2, 3, 4:
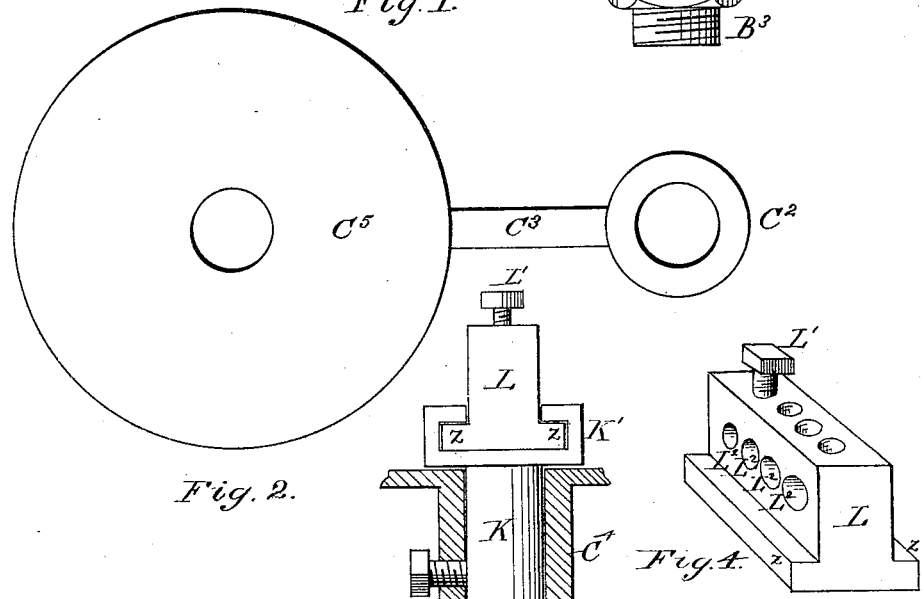

Figure 1 is an elevation of my device. Fig. 2 is a plan of the lower table and its arm. Fig. 3 is a vertical section showing a part of the lower table and a supplemental tool-holder, and Fig. 4 shows the supplemental tool-holder block.

In the drawings, A, Fig. 1, represents the spindle of the tail-stock of a lathe. To this spindle A the clamp-standard B B' B² B³ is secured by the clamp screw and nut D D', Fig. 1. To the lower end, B² B³, of the clamp-standard I attach, by means of the nut $b'$, Fig. 1, the sleeve and arm C² C³, and by this sleeve and arm the hollow boss C⁴ and lower table, C⁵. All of these parts—to wit, the sleeve C², arm C³, hollow boss C⁴, and table C⁵—may be cast all in one piece. To the upper end, B B', of the clamp-standard I attach, by means of the nut $b$, the sleeve E, arm E', and hollow boss E². The turret-head E³, Fig. 1, has a downward projecting spindle, E⁴, held in place by the nut E⁵ and set-screw $e'$. This turret-head has also an upward-projecting spindle, E⁶, which is held in position by the nut E⁷ and set-screw $e'$.

H H H, Fig. 1, represent holes into which the tools may be inserted and held by the set-screws $h\,h\,h$.

In Figs. 3 and 4 I have shown an adaptation of my device which enables me to hold slight tools in such a manner that they may be moved by the hand and at the same time guided by a templet or pattern, so that any small article may be copied, something after the manner that a cast is made. This adaptation consists in a clamping-stud, K K', Fig. 3, in the upper end of which a tool-holding block, L Z Z, Fig. 4, is placed in such a manner as to be free to slide longitudinally. L² L² L² are holes for receiving tools, which may be held in place by set-screws L' L' L' L'.

The parts illustrated in Figs. 3 and 4 relate to a device for holding small tools, and consist in a clamping-piece, K' K, the part K being a shank, which is adapted to fit into the hollow boss C⁴ of the lower table, C⁵, of the turret-head, and is therein fastened by the set-screw $e$. (See Fig. 1.) To the head of the shank K', I affix the clamp K, which serves to receive the tool-holder L, the function of which is to hold small tools.

As the tool-holder L is free to slide back and forth in the clamp K', it is apparent that the user may guide the small tools by hand, so as to follow any desired templet or form.

What I claim is—

1. In a lathe-tool holder, the combination of the stem A, clamp-standard B B' B² B³, and lower arm and table, C² C³ C⁴ C⁵, with the upper arm, E E' E², and turret-head E³, all operating together as described, and for the purpose set forth.

2. In a lathe-tool holder, the combination of the clamp-standard B B' B² B³ and lower arm and table, C² C³ C⁴ C⁵, with the clamping-stud K K' and tool-holding block L Z Z, all substantially as described, and for the purpose set forth.

BENJAMIN B. KEYES.

Witnesses:
FRANK G. PARKER,
WILLIAM EDSON.